United States Patent
Felter et al.

(10) Patent No.: US 6,327,946 B1
(45) Date of Patent: Dec. 11, 2001

(54) METHOD FOR MANUFACTURING AN IMPROVED SEAL FOR FLUID APPLICATIONS

(75) Inventors: Paul Allen Felter, Layton; Tracy Shane Nye, Farmington, both of UT (US)

(73) Assignee: Advanced Metal Products, Inc., West Bountiful, UT (US)

( * ) Notice: Subject to any disclaimer, the term of this patent is extended or adjusted under 35 U.S.C. 154(b) by 0 days.

(21) Appl. No.: 09/441,724

(22) Filed: Nov. 16, 1999

Related U.S. Application Data

(60) Provisional application No. 60/108,625, filed on Nov. 16, 1998.

(51) Int. Cl.[7] ..................................................... B23B 1/00
(52) U.S. Cl. ........................... 82/1.11; 82/46; 82/114; 82/123
(58) Field of Search .................... 82/1.11, 46, 47, 82/114, 123, 902, 113; 75/238; 277/400, 404

(56) References Cited

U.S. PATENT DOCUMENTS

| | | | |
|---|---|---|---|
| 3,611,847 | * 10/1971 | Derman et al. | 82/47 |
| 4,302,958 | * 12/1981 | Andriessen et al. | 82/47 X |
| 4,318,319 | * 3/1982 | Scholin | 82/47 |
| 4,352,308 | * 10/1982 | Samanta et al. | 82/1.11 |
| 4,482,194 | 11/1984 | Chambers, Sr. . | |
| 4,539,875 | * 9/1985 | Lee et al. | 82/1.11 |
| 4,640,156 | * 2/1987 | Nakagawa et al. | 82/1.11 |
| 5,651,295 | * 7/1997 | Tumey et al. | 82/1.11 |

* cited by examiner

Primary Examiner—Henry Tsai
(74) Attorney, Agent, or Firm—Morriss, Bateman, O'Bryant & Compagni

(57) ABSTRACT

A method for manufacturing a mechanical seal used in fluid applications, wherein the mechanical seal is comprised of a sintered (cemented) tungsten carbide ring that is turned on a lathe at a negative top rake angle instead of formed by grinding. The cemented tungsten carbide ring is initially prepared by rounding corners of the top surface to form a radii. The resulting mechanical seal yields significantly less surface damage, can be formed using faster cutting speeds and feeds than when grinding, enables formation of a greater range of complex geometries for the mechanical seals, and requires fewer passes than grinding. The compact is also formed at a significantly reduced cost as compared to grinding.

17 Claims, 4 Drawing Sheets

METHOD FOR MANUFACTURING AN IMPROVED SEAL FOR FLUID APPLICATIONS

This appln. claims benefit of Provisional No. 60/108,625 filed Nov. 16, 1998.

BACKGROUND OF THE INVENTION

1. Field of the Invention

This invention pertains generally to a method and apparatus for manufacturing a mechanical seal for use in sealing liquids in fluid handling applications. More specifically, seal faces are manufactured in such a way that they have improved properties of flatness, resistance to deformation, etc.

2. State of the Art

Mechanical seals are used to seal liquids in fluid handling applications. The seals are manufactured from a variety of metals and ceramic materials. One of the most versatile and therefore the most common material used in seal assemblies is cemented tungsten carbide.

One of the most common applications of mechanical seals is for sealing shafts on pumps where it is desirable to prevent the passage of a fluid past the shaft. It is also the case that the many types of pumps and media (fluid) being pumped require a large range of sizes and types of seals. Accordingly, seal faces typically range in diameter from less than an inch to greater than eighteen inches, with two to six inches being the most common diameters.

The sealing of the media being pumped is accomplished by rotating two seal faces against each other. Because the seal faces are extremely flat (a fraction of a micrometer in variance) the media generally cannot pass through the gap between the seal faces. Typically, one seal face will be stationary (the static face) and the mating face will be driven (the rotating face) at shaft RPM. In order to produce and maintain this small gap the seal faces must exhibit very tight control of flatness, deformation, thermal expansion, thermal conductivity, corrosion, and wear resistance. These factors will each be explained so as to understand the specific problems that they pose to the performance of a seal.

Regarding flatness of the seal faces, precision grinding and lapping using abrasive compounds is used in the manufacturing process thereof. The standard call-out for flatness is two Helium light bands, while some companies require a higher tolerance of only 1 Helium light band. Flatness is measured using a monochromatic light reflected onto an optical flat, as is known to those skilled in the art. When the seal face is placed on the optical flat a series of light bands will be produced. A thin line placed parallel to these bands should not cross more than the number of light bands in the call-out. If the seal face is not flat, the light bands will exhibit one or more patterns such as curvature, high spotting, etc. The light band pattern is analogous to contour lines on a topographical map. One Helium light band is equal to a flatness measurement of 17.4 millionths of an inch.

Along with flatness, deformation is another important attribute that must be controlled. Deformation is caused by the seal face being subjected to mechanical forces. Generally, it is controlled by the nature of the material used in fabricating seals. In other words, it is the nature of cemented tungsten carbide's extreme rigidity that enables the seal to resist deformation. For example, cemented tungsten carbide is one of the most rigid materials available, being 3 times more rigid than steel. This rigidity allows for seal designs with very small cross sections. One result of this rigidity is that seal assemblies are very compact.

Thermal expansion of the seal is another factor that must be controlled in order to resist deformation. When thermal expansion causes deformation of the seal faces, the consistent gap therebetween is eliminated. Advantageously however, cemented tungsten carbide provides a low coefficient of thermal expansion, thereby minimizing the possibility of deformation. Furthermore, a low coefficient of thermal expansion also provides advantages in conditions that subject the seal face to thermal shock such as dry running.

Seal performance is often measured in terms of the pv value, where p pressure and v=peripheral velocity. This combination of sealing pressure and velocity produces high temperatures that can vaporize the liquid film created by the sealed-out medium. High thermal conductivity of a seal enables it to conduct excess heat away from the seal faces before high temperatures can build to a dangerous level. Therefore, high thermal conductivity in the seal face material is critical in limiting this type of problem.

For example, a first cemented tungsten carbide seal face which is in contact with a second cemented tungsten carbide seal face in a water seal application can work without a problem at pv values of 100 bar m/s, with a maximum pv value of 500 bar m/s. However, higher pv values can be obtained by running a cemented tungsten carbide seal face against another material, such as carbon.

Another problem that a seal face must contend with is that of corrosion. When corrosion attacks the seal face, it causes pitting, leaching, etc., which can lead to seal failure. In the prior art, corrosion resistance is controlled by utilizing special binders in the cemented tungsten carbide. The most common binder used in seal faces to resist corrosion is Nickel. The standard percentage of Nickel binder used in the United States for seal faces is 6% by weight. However, the best possible solution to corrosion would be no binder whatsoever.

The most widely recognized property of cemented tungsten carbide is wear resistance. Wear resistance is especially critical in seal applications where the medium being sealed contains hard particles that can penetrate between the seal faces. Cemented tungsten carbide offers the wear resistance required to combat this type of problem while exhibiting higher thermal conductivity than ceramics which provide even higher wear resistance than cemented tungsten carbide. Disadvantageously, ceramics are also extremely brittle, less able to withstand thermal and mechanical shock, and require special handling.

Cemented tungsten carbide is recommended for seal faces when the application requires a material with some or all of the properties of flatness, deformation, thermal expansion, thermal conductivity, corrosion, and wear resistance as discussed above. In light duty applications or in applications requiring extreme corrosion resistance where there is little or no mechanical/thermal shock, silicon carbide, bronze, carbon, cast iron and stainless might also be used.

Other limiting factors when choosing cemented tungsten carbide as a seal material are size, complexity, and cost. The size of a seal ring can eliminate the use of cemented tungsten carbide, as most domestic suppliers have a limit of roughly 13" diameter. Complex seal faces with geometric features that are difficult to press and/or machine, geometries not suited to carbide (very thin walls, internal grooves perpendicular to the face, etc.) will also eliminate the use of carbide. Cost is the final factor when considering cemented tungsten carbide as a seal material. In some cases the product can be produced from cemented tungsten carbide but due to size and/or complexity, alternate materials that will perform in the application at lower cost are chosen.

Nevertheless, when cemented tungsten carbide is appropriate as a seal material, the manufacturing processes of the state of the art are the same as when manufacturing other carbide products (i.e. turning inserts, wear parts, punches, dies, etc.). Specifically, tungsten carbide powder, where each crystal has a covalently bonded chemistry of Tungsten and Carbon and is not a mixture of the two, is mixed with Cobalt or Nickel (referred to as the binder) powder for the desired binder composition. This mixture is then cold pressed to the desired shape and is referred to as a pre-sintered blank. The blank has the consistency and appearance of black chalk. The shape is generally pressed 14 to 19% larger than the finished part shape. Sometimes wax is mixed in with the binder so that the pre-sintered blank can be machined to more complex geometries without breaking, fracturing or chipping. The pre-sintered blank is then placed in a sintering furnace at a high enough temperature to melt the binder.

Many companies are now using a sinter HIP (Hot Isostatic Press) to generate high pressures during the sintering process to eliminate pits and voids in the carbide. When the blank is removed from the sintering furnace it is now referred to as a sintered blank. Because the binder has melted, the blank size has shrunk from its original size to the approximate size of the finished part. However, because of the shrinkage, the sintered blanks must have carbide stock which is generally removed by grinding for the part to achieve its finished size. On small production runs of carbide (the cemented tungsten carbide), 0.030" of stock per side is allowed for finishing, while on large production runs in controlled manufacturing conditions, 0.010" stock is allowed.

The state of the art method used to machine cemented tungsten carbide into a seal is by grinding. There are many types of grinding machines used to grind stock from carbide parts. Generally, 0.0005" to 0.002" can be removed per pass of a grinding wheel. Diamond grinding wheels are used almost exclusively because of cemented tungsten carbide's hardness. If more than 0.002" stock is removed per pass with a grinding wheel, the risk of surface cracking and heat checking increases dramatically. Creep feed grinders are also used to remove large amounts of cemented tungsten carbide. The wheel is fed slowly into the part, but only one pass is used.

Now that the methods of grinding cemented tungsten carbide have been described, it is important to realize that there are some notable problems with the state of the art. For example, grinding leaves surface damage and residual surface stresses. Applications that require the seals to be subjected to high loads, fatigue resistance, corrosion, resistance, etc., require a damage free surface on the seals to prevent crack initiation at the surface. Therefore, feeds of the seals are relatively slow and grinding depths are limited. Furthermore, inside diameters of the seals take longer to grind because the wheel is smaller and grinds at a slower surface speed. Because stock is removed by a grinding wheel, finished part geometries can only be as complex as a grinding wheel geometry will allow. Disadvantageously, cemented tungsten carbide rings (such as those used to form large seals) often warp from the residual grinding stresses and require that the part be scrapped or reworked at additional cost.

It would therefore be an improvement over the state of the art in carbide seal manufacturing for fluid applications to be able to manufacture the seal having a surface with less damage than can otherwise be created by grinding. It would be another improvement if the seal surface had reduced residual surface stresses. It would be a further improvement if it was possible to form an edge between a top surface of the seal and an outer side edge that had less damage than when created by grinding, to thereby better inhibit crack formation. Other improvements would be to decrease the manufacturing time, enable the manufacturing of more complex finished geometries than are possible with grinding, and improve the ability to make larger seals without the danger of warping that is caused by residual grinding stresses.

OBJECTS AND SUMMARY OF THE INVENTION

It is an object of the present invention to provide an improved method of creating a seal for use in fluid applications that better withstands the forces to which it is subjected.

Another object is to provide an improved seal manufactured from cemented tungsten carbide using a turning process.

Another object is to provide an improved seal which has less inherent residual damage than a comparable seal made using a grinding process.

Another object is to provide an improved seal which has less residual surface stresses than a seal manufactured using the grinding process.

Another object is to provide an improved seal which can be manufactured using a process that is faster than grinding.

Another object is to provide a seal which can have more complex geometries than are possible when manufactured using a grinding process.

Another object is to provide a larger seal which will not warp because it is not subject to residual grinding stresses.

The preferred embodiment of the present invention is a method for manufacturing a mechanical seal used in fluid applications, wherein the mechanical seal is comprised of a sintered (cemented) tungsten carbide ring that is turned on a lathe at a negative top rake angle instead of formed by grinding. The cemented tungsten carbide ring is initially prepared by rounding corners of the top surface to form a radii. The resulting mechanical seal yields significantly less surface damage, can be formed using faster cutting speeds and feeds than when grinding, enables formation of a greater range of complex geometries for the mechanical seals, and requires fewer passes than grinding. The compact is also formed at a significantly reduced cost as compared to grinding.

In a first aspect of the invention, turning parameters of depth of cut, surface speed and feed rate are modified in order to obtain the desired seal qualities.

In a second aspect of the invention, turning parameters of angle of top rake and angle of side rake are modified in order to obtain the desired seal qualities.

In a third aspect of the invention, the quality or grade of the sintered blank is modified which results in the ability to modify turning parameters in order to obtain the desired seal qualities.

These and other objects, features, advantages and alternative aspects of the present invention will become apparent to those skilled in the art from a consideration of the following detailed description taken in combination with the accompanying drawings.

DESCRIPTION OF THE INVENTION

Reference will now be made to the invention in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow.

The presently preferred embodiment of the present invention comprises utilizing a turning process to manufacture a mechanical seal from cemented tungsten carbide. As explained previously, a sintered blank is often preferred as the material for a mechanical seal because of its hardness. Furthermore, those skilled in the art of using cemented tungsten carbide for mechanical seals grind them. This is because of a mind set which is common among those in the industry.

Specifically, carbide is generally not considered "turnable" on a lathe because it is known that carbide "cuts" other materials and is therefore not something that can be easily or inexpensively cut itself. Another factor which is likely to be a reason for this misconception is that companies that work extensively with cemented tungsten carbide generally do not have turning equipment. Accordingly, these companies do not have experience turning with super hard materials. Likewise, another factor is that a development program using superhard materials is costly to run. Therefore, it can be difficult to learn how to turn carbide, which makes it something that is avoided.

Figure 1:
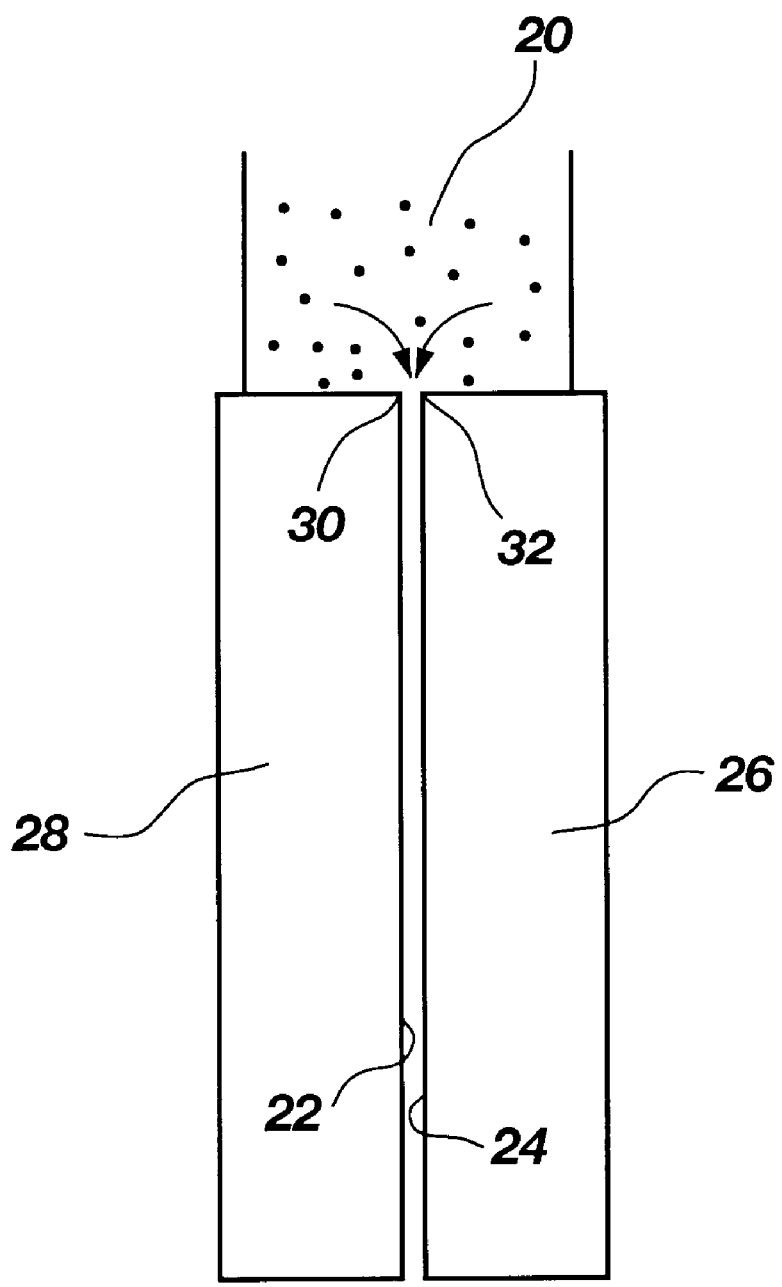
FIG. 1 is a profile view of two mechanical seals of the prior art with an exaggerated gap between them which shows that an abrasive fluid is entering at the edges through chips.

FIG. 1 shows that abrasive fluids 20 will try to enter between the faces 22, 24 of two opposing seals 26, 28, where the gap between the faces 22, 24 is exaggerated for illustration purposes. This occurs at chips in the surface faces 22, 24 or at the outer edges 30, 32. It is well known that most cracks and other surface damage is initiated at the outer edges 30, 32.

However, the inventors have extensive experience with superhard materials. Furthermore, the cost of diamond and diamond-like materials has greatly been reduced with commercialization. In addition, lathes now being manufactured are more rigid, precise, and capable of repeatable runs and are, as a result, more capable of doing hard turning. Nevertheless, even though turning cemented tungsten carbide has become more economical, further investigation into the applications thereof has been avoided by those skilled in the art because of the aforementioned misconceptions in the industry.

In developing the cemented tungsten carbide seals of the present invention, it has been discovered by the inventors that there are several factors that are critical to successfully and economically turning cemented tungsten carbide.

A first factor is that diamond or CBN are the cutting tool materials of choice. This choice was made because of the hardness of these materials, and the nature of the cuts that they make in cemented tungsten carbide.

A second factor is that tools must be in rigid tool holders at negative rake angles. It is mentioned at this time that in a preferred embodiment, the rake angle is approximately –6 degrees. However, this is only a preferred angle. It has been determined through experimentation that the range of rake angles that can be used for successful and economical cutting extends from between +20 degrees to –30 degrees. The angle selected depends on various factors which include surface speed of the cemented tungsten carbide on the lathe, the depth of cut being made into the cemented tungsten carbide, the feed rate of the cemented tungsten carbide, the percentage of binder in the cemented tungsten carbide, and the angles of both the top rake and the side rake.

Accordingly, a third factor is the rake angle. Those skilled in the art of turning accept as a standard method of cutting that a cutting edge is turned into (positive rake angle) the material being cut. However, it is a feature of the present invention that a negative rake angle is preferred when cutting the cemented tungsten carbide. Essentially, the cutting edge of the diamond or other cutting material is turned away from the cemented tungsten carbide. It was discovered that, among other things, this was the only way to reduce damage to the cemented tungsten carbide.

Another significant discovery was made by the inventors through many turning trials. Specifically, radii or chamfers must be cut on the corners of the cemented tungsten carbide in order to prevent chipping on the edges. This new information made the present invention possible. Many cemented tungsten carbide blanks were ruined and chipped until this technique was discovered.

Figure 2:
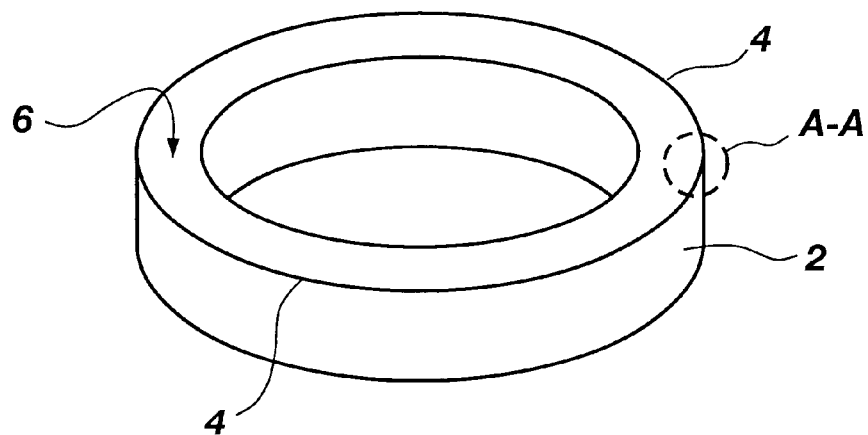
FIG. 2 is a perspective view of an annular mechanical seal formed from cemented tungsten carbide which has been turned on a lathe.

FIG. 2 is provided as a perspective view of a typical mechanical seal 2 which is formed from turning a sintered blank formed of cemented tungsten carbide. The mechanical seal 2 has an outer edge 4, a top surface 6, and a side 8. Circle A—A is highlighted for the purpose of showing the portion of the mechanical seal 2 which is shown in FIGS. 3 and 4.

Figure 3:
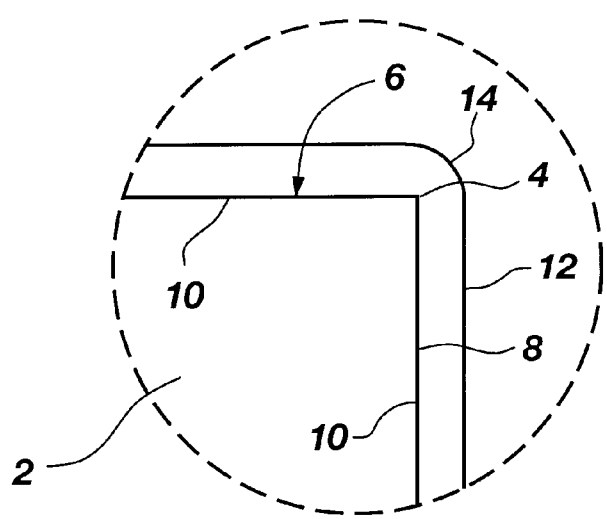
FIG. 3 is a close-up and cross-sectional view of a portion of the annular mechanical seal of FIG. 2 as represented by circle A—A, and which is produced in accordance with the principles of the presently preferred embodiment of the invention.
Figure 4:
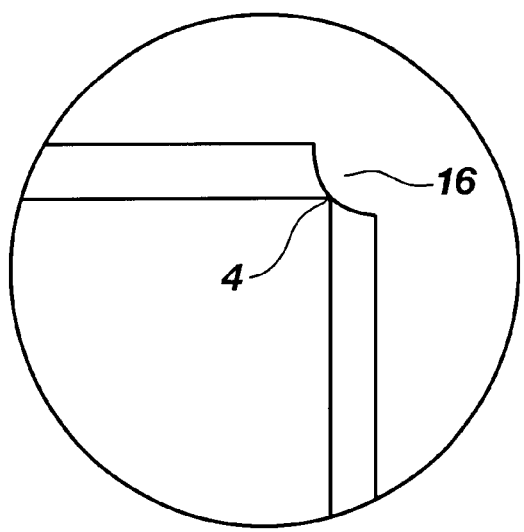
FIG. 4 is a close-up and cross-sectional view of a portion of the annular mechanical seal which shows that a portion along the outer edge is formed into a chamfer in order to prevent chip formation along the outer edge during the turning process.

Referring to FIG. 3, the beginning outer shape of the sintered blank is shown by outline 12. The desired finished shape of the carbide seal 2 is shown in cross section as line 10, having a face 6 and a side 8. Outer edge 4 is the perimeter of the mechanical seal 2 on the top surface 6. It is at this edge 4 that the mechanical seals typically fail during manufacturing and/or use when they are manufactured using the grinding process.

Therefore, one novel feature of the present invention is that manufacturing by turning the cemented tungsten carbide on a lathe minimizes chips in the outer edge 4. The finish of the face 6 (see FIGS. 2 and 3) itself should not be minimized. Micrographs taken of a ground surface and a turned surface show a substantially smoother surface with less damage in the turned surface as opposed to the ground surface.

However, it was also discovered that simply turning the sintered blank, while producing a much smoother face 6 and less chips in the outer edge 4, could still result in the formation of chips.

Accordingly, another novel feature of the present invention is the discovery that by beginning with a radii or at the corner which is going to form the outer edge 4, it is possible to turn the corner without chipping it. The radii 14 is shown in FIG. 3.

FIG. 4 is provided to show an alternative to the radii 14. Specifically, a chamfer 16 is now shown along the outer edge 4.

Figure 5:
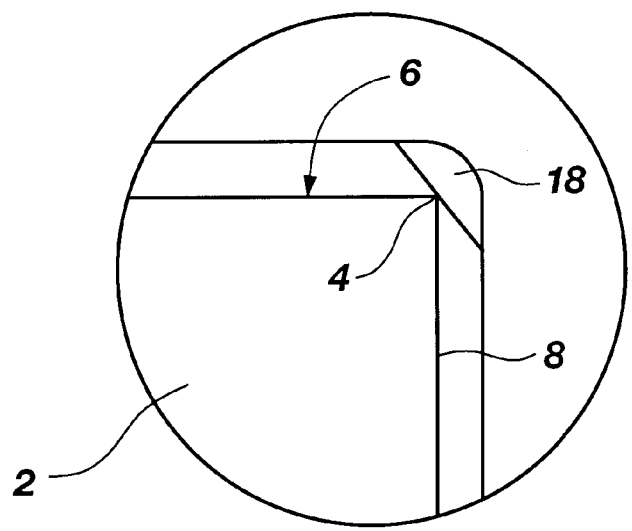
FIG. 5 is a close-up and cross-sectional view of a portion of the annular mechanical seal which shows that a straight portion along the outer edge is cut off in order to prevent chip formation along the outer edge during the turning process.

FIG. 5 shows that a portion 18 of the sintered blank 2 is cut off in a straight line. The depth of the portion 18 is selected by choosing the portion to approximately intersect the desired outer edge 4. The sintered blank 2 is then turned until reaching the desired depth of the surface 6 and side 8.

One critical aspect of the invention that is learned from experimentation is that if the outer edge 4 is approached when turning, and the outer edge generally forms a right angle, it is prone to chip. Forming a radii, chamfer or straight edge at the outer edge can therefore prevent chip formation during manufacturing, resulting in a mechanical seal that should last longer than one which is formed by grinding.

Another novel feature of the present invention is that turning a sintered blank formed from cemented tungsten carbide can be done rapidly, as opposed to grinding. Typically, a sintered blank has as much as 0.030 inches of carbide to be cut therefrom to form the finished mechanical seal. Turning is capable of cutting all that material away in a single pass, substantially reducing the time it takes to finish a mechanical seal.

Figure 6:
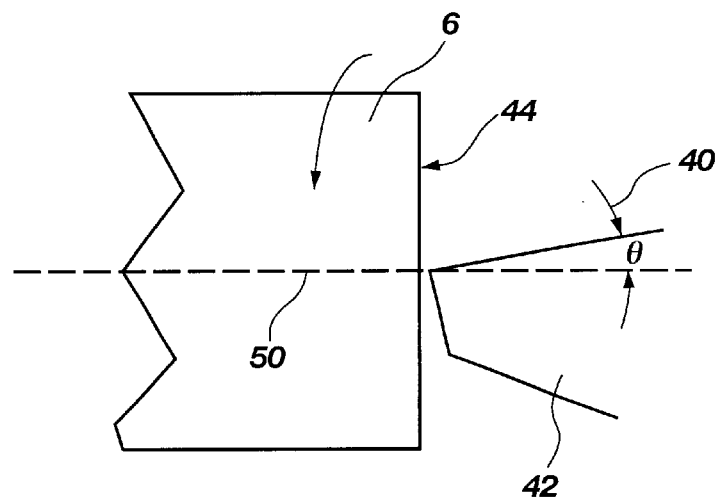
FIG. 6 is a profile view with respect to a cutting instrument of a top rake angle.

Several important factors in manufacturing time are parameters referred to as top rake angle, side rake angle, depth of cut, surface speed, feed rate and percentage of binder contents. FIG. 6 is a profile view of a sintered blank 6 that illustrates the top rake angle 40 which is the angle that a cutting instrument 42 of a lathe makes with a lengthwise axis 50 of the sintered blank. The cutting instrument 42 of the lathe is a sharp, knife-like tool that extends at an angle to the surface of the workpiece to be machined. The cutting instrument 42 is the part of the lathe that removes material from the workpiece. In this case, the workpiece is a surface 44 of the sintered blank 6 that is being cut to form a sealing ring.

Figure 7:
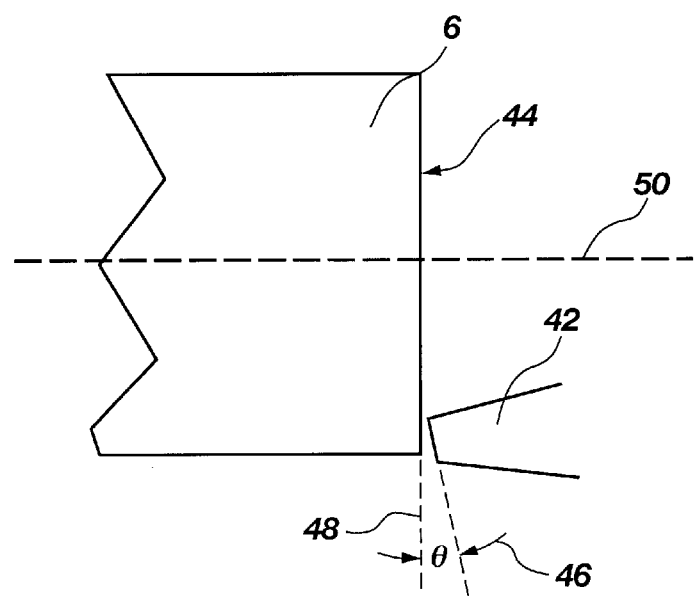
FIG. 7 is a top view with respect to a cutting instrument of a side rake angle.

In contrast, FIG. 7 is a top view with respect to the cutting instrument 42 that shows the side rake angle 46 which is the angle that the cutting instrument 42 makes with respect to a plane 48 which is perpendicular to a central axis 28 of the mechanical seal 6. Thus, the plane 48 is parallel to the surface 44 of the sealing ring. By creating a side rake angle, the cutting tool allows for the cemented tungsten carbide that is being shaved from the sintered blank to move to the side of the cutting edge, and not interfere with the cut being made. The feed rate is defined as how far the sintered blank travels each time the lathe turns once. The percentage of binder contents is the percentage of material used as a binding material in the sintered blank.

It is a feature of the present invention that all of these parameters are adjustable in order to obtain the best results for a particular grade or quality of sintered blank. However, for a sintered blank of average quality, it has been determined that a negative top rake angle is the most advantageous. Specifically, a top rake angle of −6 degrees works well. An optimal side rake angle has been determined to be 6 degrees, a depth of cut of 0.005 inches, a surface speed of 80 surface feet per minute, and a feed rate of 0.002 inches per revolution.

Although these parameters are useful settings when beginning to turn a sintered blank, they are not ideal for every situation and condition. For example, some values are better than others in terms of speed of manufacturing. But other values will result in an extension of tool life of the lathe. Still other values are better to achieve a specific geometry of the finished mechanical seal, or will work better with binder content percentages of a particular value. Accordingly, the following ranges of values are provided as a guide for possible changes that can be made.

Specifically, the top rake angle can be varied between +20 degrees and −30 degrees. The side rake angle can be varied as well. The depth of cut can be varied between 0.005 inches and 0.060 inches. The surface speed can be varied between 40 to four or five thousand feet per minute. However, at very high surface speeds, the depth of cut is typically made much smaller. However, the substantially increased surface speed makes up for the reduced cutting depth, resulting in similar manufacturing times. Finally, the feed rate can be varied between 0.005 inches per revolution up to 0.040 inches per revolution.

It is important to realize that experimentation has shown that these parameters can all be varied greatly, and should be varied depending upon the condition of the sintered blank being turned, and the desired geometry of the finished mechanical seal.

It should also be stated that the cutting tool used on a lathe for turning the mechanical seal of the present invention is generally selected from the group of cutting tool materials consisting of diamond, CBN and PCD (polycrystalline diamond). PCD is one material used as the cutting element to cut tungsten carbide on a lathe. Other materials harder than carbide can also be used. These are materials which are sufficiently hard so as to make turning the mechanical seals from cemented tungsten carbide possible.

It is to be understood that the above-described arrangements are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A method for manufacturing a mechanical seal for use in fluid applications by turning a cemented tungsten carbide sintered blank, said method comprising the steps of:

(1) placing a cemented tungsten carbide ring on a lathe;
   (2) forming a junction between a top surface and a side surface of the cemented tungsten carbide ring at an angle which is not a right angle;
   (3) setting a cutting tool on the lathe at a top rake angle with respect to the cemented tungsten carbide ring; and
   (4) cutting the cemented tungsten carbide ring at the top rake angle to thereby form the mechanical seal by turning to a finished shape and size.

2. The method as defined in claim 1 wherein the junction formed between the top surface and the side surface of the cemented tungsten carbide ring is a radii around an outer edge thereof.

3. The method as defined in claim 1 wherein the junction formed between the top surface and the side surface of the cemented tungsten carbide ring is a chamfer around an outer edge thereof.

4. The method as defined in claim 1 wherein the junction formed between the top surface and the side surface of the cemented tungsten carbide ring is a straight edge which is formed at approximately a 45 degree angle with respect to the top surface and the side surface.

5. The method as defined in claim 1 wherein the method further comprises the step of setting the top rake angle to a negative top rake angle with respect to a horizontal plane extending through the center and parallel to a lengthwise axis of the cemented tungsten carbide ring.

6. The method as defined in claim 5 wherein the method further comprises the step of selecting the negative top rake angle to be approximately −6 degrees.

7. The method as defined in claim 5 wherein the method further comprises the step of selecting the negative top rake angle in order to extend the life of the cutting tool, and to prevent formation of chips in the cemented tungsten carbide ring.

8. The method as defined in claim 1 wherein the method further comprises the step of selecting a material for the cutting tool from the group of cutting tool materials consisting of diamond, CBN and PCD.

9. The method as defined in claim 1 wherein the method further comprises the step of varying parameters of the lathe to thereby achieve variations in geometry of the finished mechanical seal, wherein the parameters of the lathe which are varied are selected from the group of variables consisting of top rake angle, side rake angle, depth of cut, surface speed, and feed rate.

10. The method as defined in claim 9 wherein the method further comprises the step of varying the top rake angle between +20 degrees and −30 degrees.

11. The method as defined in claim 9 wherein the method further comprises the step of varying the side rake angle between +30 degrees and −30 degrees.

12. The method as defined in claim 9 wherein the method further comprises the step of varying the depth of cut between 0.005 inches and 0.060 inches.

13. The method as defined in claim 9 wherein the method further comprises the step of varying the surface speed between 40 and 5000 feet per minute.

14. The method as defined in claim 9 wherein the method further comprises the step of varying the feed rate between 0.005 inches and 0.040 inches per revolution.

15. The method as defined in claim 1 wherein the method further comprises the step of varying parameters of the lathe to thereby extend a life of the cutting tool, wherein the parameters of the lathe which are varied are selected from the group of variables consisting of top rake angle, side rake angle, depth of cut, surface speed, and feed rate.

16. The method as defined in claim 1 wherein the method further comprises the step of varying parameters of top rake angle, side rake angle, depth of cut, surface speed, and feed rate in accordance with a percentage of binding materials in the cemented tungsten carbide ring.

17. A method for manufacturing a mechanical seal for use in fluid applications by turning a cemented tungsten carbide sintered blank, said method comprising the steps of:
(1) placing a cemented tungsten carbide ring on a lathe;
(2) forming a radii or chamfer between a top surface and a side surface of the cemented tungsten carbide ring;
(3) setting a cutting tool on the lathe at a top rake angle with respect to the cemented tungsten carbide ring; and
(4) cutting the cemented tungsten carbide ring at the top rake angle to thereby form the mechanical seal by turning to a finished shape and size.

* * * * *